(12) United States Patent
Kim et al.

(10) Patent No.: US 7,688,999 B2
(45) Date of Patent: Mar. 30, 2010

(54) TARGET DETECTING SYSTEM AND METHOD

(75) Inventors: Kye-Kyung Kim, Daejeon (KR); Soo-Hyun Cho, Deajeon (KR); Hye-Jin Kim, Incheon (KR); Jae-Yeon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1157 days.

(21) Appl. No.: 11/287,936

(22) Filed: Nov. 28, 2005

(65) Prior Publication Data

US 2006/0140481 A1    Jun. 29, 2006

(30) Foreign Application Priority Data

Dec. 8, 2004  (KR) .................. 10-2004-0103033
Aug. 26, 2005 (KR) .................. 10-2005-0078822

(51) Int. Cl.
   *G06K 9/00* (2006.01)
(52) U.S. Cl. ...................... 382/103; 382/190
(58) Field of Classification Search ............... 382/103, 382/190
   See application file for complete search history.

(56) References Cited

U.S. PATENT DOCUMENTS

| | | | | | |
|---|---|---|---|---|---|
| 4,396,903 | A | * | 8/1983 | Habicht et al. ............... | 382/103 |
| 5,587,929 | A | * | 12/1996 | League et al. ................ | 342/159 |
| 5,809,161 | A | * | 9/1998 | Auty et al. ................... | 382/104 |
| 5,864,630 | A | * | 1/1999 | Cosatto et al. .............. | 382/103 |
| 6,335,985 | B1 | * | 1/2002 | Sambonsugi et al. ........ | 382/190 |
| 6,355,985 | B1 | * | 3/2002 | Brand ......................... | 257/790 |
| 6,570,608 | B1 | * | 5/2003 | Tserng ....................... | 348/143 |
| 6,847,408 | B1 | * | 1/2005 | Webb ......................... | 348/607 |
| 7,133,562 | B2 | * | 11/2006 | Kondo ........................ | 382/236 |
| 7,366,325 | B2 | * | 4/2008 | Fujimura et al. ............ | 382/104 |
| 2001/0005219 | A1 | * | 6/2001 | Matsuo et al. .............. | 348/169 |
| 2002/0085738 | A1 | * | 7/2002 | Peters ......................... | 382/103 |
| 2004/0101162 | A1 | * | 5/2004 | Higaki et al. ............... | 382/103 |
| 2004/0151342 | A1 | * | 8/2004 | Venetianer et al. .......... | 382/103 |

FOREIGN PATENT DOCUMENTS

| JP | 2004-265252 | 9/2004 |
|---|---|---|
| KR | 1020030024354 | 3/2003 |

OTHER PUBLICATIONS

Detecting Moving Objects, Ghosts and Shadows in Video Streams, Rita et al, IEEE, 0162-8828, vol. 25, Oct. 2003, pp. 1337-1342.*

* cited by examiner

*Primary Examiner*—Samir A. Ahmed
*Assistant Examiner*—Jayesh Patel
(74) *Attorney, Agent, or Firm*—Ladas & Parry LLP

(57) ABSTRACT

A target detecting system and method for detecting a target from an input image is provided. According to the target detecting system and method, when a target is detected from an input image and there are moving areas in the input image, camera movement parameters are obtained, image frames are transformed, and movement candidate areas are extracted from the image frame and the previous input image frame. In addition, image feature information is extracted from the input image, and based on the movement candidate areas and the image feature information a shape of the target is extracted. Therefore, the target can be exactly and rapidly extracted and tracked.

36 Claims, 11 Drawing Sheets

TARGET DETECTING SYSTEM AND METHOD

CROSS-REFERENCE TO RELATED APPLICATION

This application claims priority to and the benefit of Korean Patent Application Nos. 10-2004-0103033 & 10-2005-0078822 filed in the Korean Intellectual Property Office on Dec. 8, 2004 & Aug. 26, 2005, the entire contents of which are incorporated herein by reference.

FIELD OF THE INVENTION

The present invention relates to a target detecting system and method. More particularly, the present invention relates to a target detecting system and method for detecting a target from an input image.

BACKGROUND OF THE INVENTION

Generally, many studies on detecting and tracking a moving object using a camera with a fixed position and a fixed view point have been performed. A background image is obtained using the camera in the absence of a moving object, and then two consecutive images among an image sequence obtained with a predetermined interval are compared. In this case, except for a moving object, the other image areas remain the same. Therefore, when there is a moving object, it may be easy to detect the moving object by obtaining a difference between two consecutive images.

Also, many studies on detecting and tracking a moving object using a camera with a fixed position and a variable view point have been performed. When the camera moves, the background area changes and it is more difficult to detect a moving object in the camera's field of view. In this case, the current image is transformed using camera movement information extracted from two consecutive images, and then the moving object is extracted using a difference of two consecutive images among an image sequence. Also, the images of the peripheral areas to which the camera can move are previously obtained, and then the moving object is detected by comparing image features between the present image which the camera detects and the background image.

In a dynamic camera environment wherein the camera is mounted to a moving object, such as a mobile robot, (hereinafter called a mobile camera), sway caused by the flexible viewpoint variance and movement of the robot are included in the images captured by the camera. When a moving object is to be detected using a mobile dynamic camera, it is difficult to extract only the moving object by removing the camera movement information because the camera movement information is combined with the movement information of the moving object.

In order to extract the camera movement information, feature points of two consecutive images are extracted from corner points and then the extracted corner points are matched with each other. In addition, camera movement is transformed using a linear conversion or non-linear conversion method, and then the moving object is extracted using the difference of the two consecutive images. However, camera movement information cannot be exactly extracted in this manner and so the finally extracted moving object information generally has camera movement information mixed therewith.

Moving object prediction models, such as a kalman filter or a particle filter can fail to detect and track a moving object in a dynamic camera environment. It can also take a long processing time to remove the camera movement information so that it is impossible to track and extract the same in real-time.

SUMMARY OF THE INVENTION

The present invention has been made in an effort to provide a target detecting system and method having advantages of extracting a shape of a moving object in real-time from an image input from a dynamic camera and of tracking the shape of the extracted moving object in real-time. In addition, the present invention has been made in an effort to provide a target detecting system and method having advantages of detecting a moving object in a dynamic camera environment along with compensating the camera movement information.

A preferred embodiment of a target detecting system includes an image input unit, e.g., a camera, which obtains a target image to be detected and transmitted to a shape detector. The shape detector is embodied as a computer and computer program instructions. The computer program instructions cause the computer to extract a human shape from the target image based on movement candidate areas and image feature information extracted through an image difference of temporally-consecutive or "neighboring" frames among an image sequence transmitted from the image input unit to the shape detector. Those of ordinary skill in the art will appreciate that an alternate but equivalent embodiment can use image frames that are not necessary consecutive but which are temporally very close together, e.g., every second, third, fourth, etc. image frames can also be compared, albeit with increasingly less likelihood of success.

A preferred embodiment of a target detecting method includes obtaining camera movement parameters on there being a movement area in the input image and transforming an image frame using the obtained movement parameters, extracting movement candidate areas from the image frame and the previously input image frame, extracting image feature information from the input image, and extracting a target human shape based on the movement candidate areas and the image feature information.

DETAILED DESCRIPTION OF THE EMBODIMENTS

Exemplary embodiments of the present invention will hereinafter be described in detail with reference to the accompanying drawings.

Figure 1:
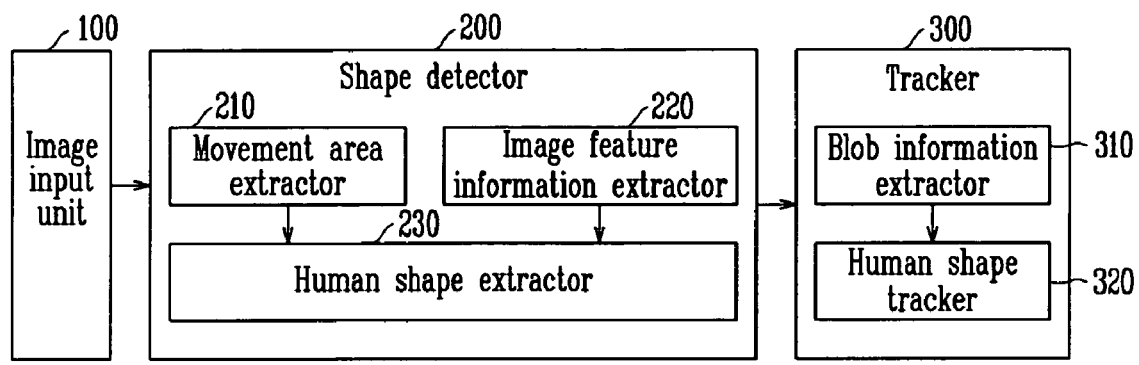
FIG. 1 is a schematic diagram of a target detecting system according to an exemplary embodiment of the present invention.

As shown in FIG. 1, a target detection system according to an exemplary embodiment of the present invention includes an image input unit 100, a shape detector 200, and a tracker 300.

The image input unit 100 preferably includes a digital camera, not shown for clarity but well known to those of ordinary skill in the art, which is mounted to a robot, and obtains an image of a body to be detected or recognized (hereinafter, called a target) and which transmits the obtained target image the shape detector 200 as shown in FIG. 1. An alternate embodiment of the image input unit 100 includes a conventional, i.e., non-digital camera, the output of which is a convention photograph and a scanner, which converts an image into digital data that can be processed by a shape detector.

The shape detector 200 is preferably embodied as a computer and software (computer program instructions) and it extracts movement information by differencing consecutive images among an image sequence consecutively transmitted from the image input unit 100. When camera movement information, such as camera viewpoint, camera position, and camera sway, occur, the movement information is analyzed so that edge information is extracted between the previous image frame and current image frame to be compensated by camera movement parameter are obtained.

The shape detector 200 corrects the camera movement information using the movement parameters, and then extracts the movement area, from which the camera movement information is firstly removed, by differencing between previous image frame and current image frame, which is transformed by camera movement parameter.

In addition, the shape detector 200 also extracts image feature information, such as edge, color, and shape information, and extracts a person shape, that is, a silhouette, through the image feature information and the movement area from which the camera movement information has been removed.

The tracker 300 obtains blob information for the extracted a person shape and tracks the targets by matching the blobs to be tracked.

In more detail, the image input unit 100 can obtain an image of m×n pixels using the camera mounted to the mobile robot. In this case, the camera may obtain two types of images when the camera does not move and when the camera moves.

When the camera does not move, the type of image includes a background area image without movement information and an image with person movement information. Alternatively, when the camera moves, the other type of image includes an image with only camera movement information and an image with both a person and camera movement information.

The shape detector 200 includes a movement area extractor 210, an image feature information extractor 220, and a human shape extractor 230.

First, the movement area extractor 210 determines whether the image transmitted from the image input unit 100 includes camera movement information.

Figure 2:
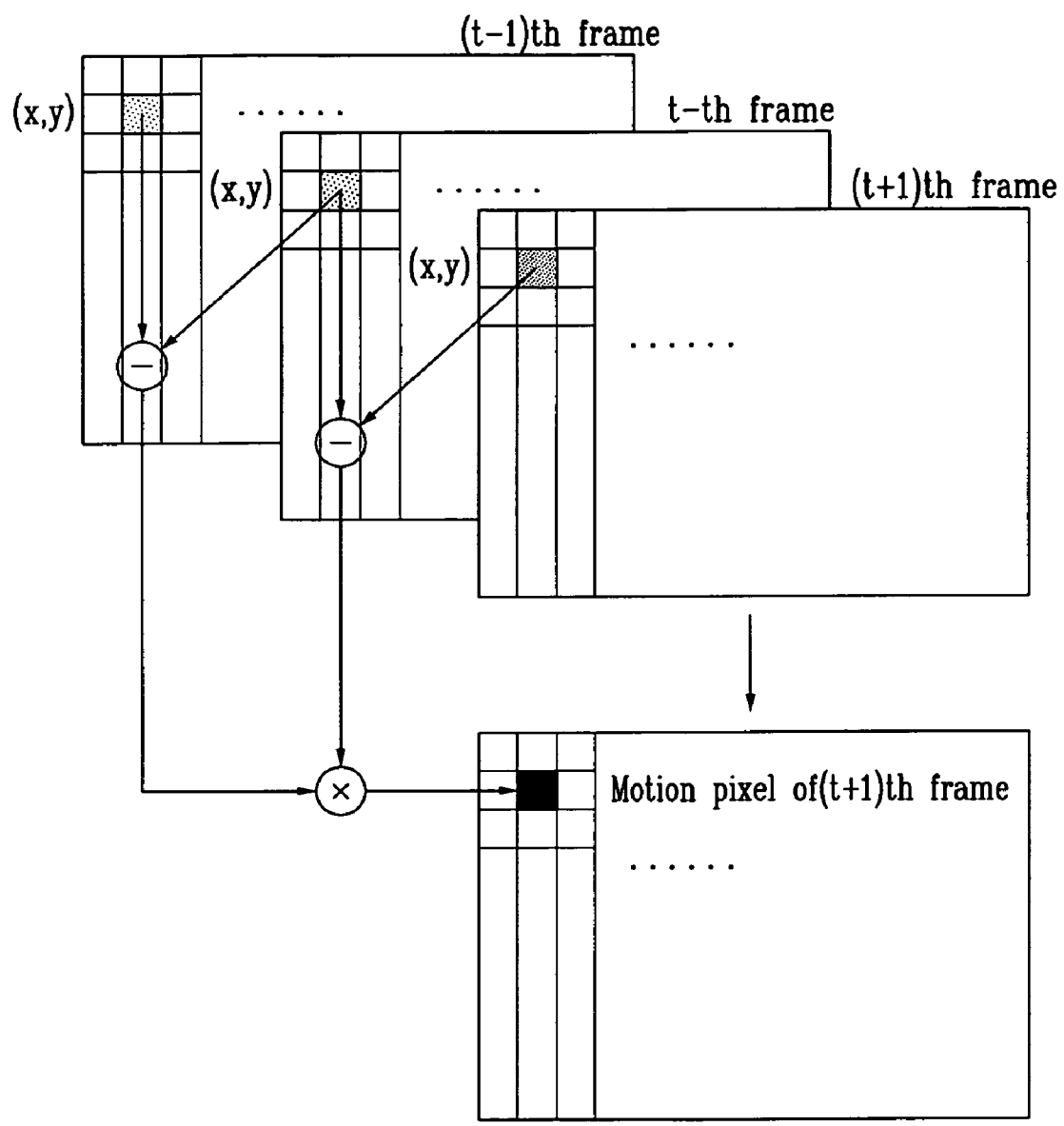
FIG. 2 illustrates a method for detecting a motion pixel of (t+1)-th frame according to an exemplary embodiment of the present invention.

With regard to FIG. 1 and FIG. 2, the movement area extractor 210 considers a pixel (hereinafter, called a motion pixel) as being moved when the brightness difference of the pixel (x,y) between three consecutive (t−1)-th, t-th, and (t+1)-th image frames among the obtained image sequence is greater than a threshold value. In this case, the motion pixel may be obtained as follows.

If $|f_t(x,y) - f_{t-1}(x,y)| > T_1$ & $|f_{t+1}(x,y) - f_t(x,y)| > T_1$ then $m_{t+1}(x,y)$ is moving object pixel (Equation 1)

In Equation 1, ft−1, ft, and ft+1 are given as the respective (t−1)-th, t-th, and (t+1)-th frames, and T1 is given as a threshold value. The threshold value T1 approximately satisfies $10 \leq T1 \leq 20$. The movement area extractor obtains the motion pixels for all pixels within the input image of m×n size using Equation 1.

Next, the movement area extractor 210 determines whether the respective motion pixels include the camera movement information along with the user movement through blob analysis of the motion pixels.

Figure 3:
FIG. 3 illustrates an image frame obtained according to an exemplary embodiment of the present invention.
Figure 4:
FIG. 4 illustrates a difference image between two consecutive images when a camera and a person simultaneously move according to an exemplary embodiment of the present invention.

That is, when both the person and the camera move from the image frame of FIG. 3, the difference image appears as shown in FIG. 4.

When connected component blobs for the motion pixels distributed within the image of m×n size satisfy Equation 2 as follows, the movement area extractor 210 determines that the present image frame has included a pixel having the camera movement information.

$$\max_x [M_t^c(x,y)] - \min_x [M_t^c(x,y)] > T_2 \quad c = 1, 2, 3, \cdots n \quad \text{(Equation 2)}$$

Figure 5:
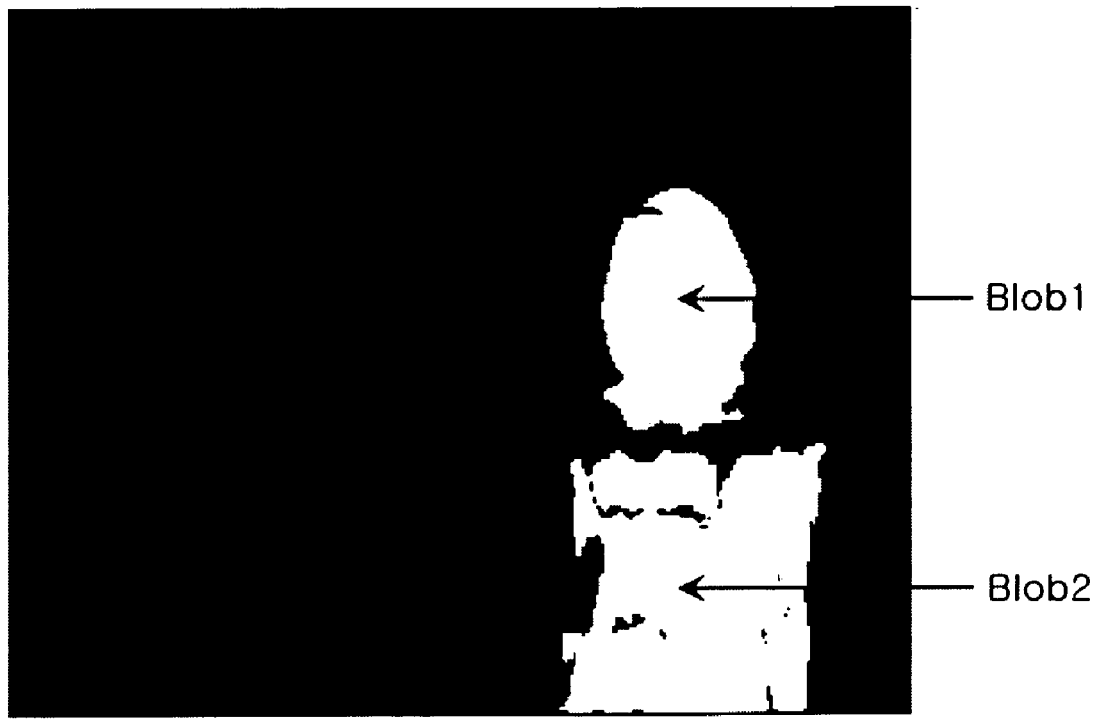
FIG. 5 illustrates blobs of a person shape extracted according to an exemplary embodiment of the present invention.

As used herein, the term "blob" refers to an image and/or image portion formed by binding adjacent pixels having the same or similar characteristics in the image. By way of example, as shown in FIG. 5 two blobs, i.e., blob 1 and blob 2 are formed by binding adjacent pixels among white pixels.

In Equation 2, $M_t^c$ is defined as the connected components for the motion pixels of the t-th frame, and the connected components are used to group pixels based on the connectivity of the pixels. Therefore, all the pixels within the connected components have a similar brightness value, and indicate the above-described blobs.

In addition, T2 is defined as a threshold value and satisfies $T_2 = 0.8 \times w$, wherein w is given as the transverse width of the image.

The maximum coordinate of x and the minimum coordinate of x are obtained among the connected components for the motion pixels of the t-th frame. The maximum coordinate of x and the minimum coordinate of determine how many movement areas are distributed over the entire image width. When the camera moves, the movement information is detected over the entire image width w. However, when the camera does not move and the user moves, the movement information may be detected over only a part of the image width w. 0.8 is a constant multiplied by the image width w and obtained through experiments, and accordingly, other constants may be used.

That is, over the entire image width, when there are movement areas less than a predetermined threshold value T2, it is considered as that the camera does not move and the user moves, and when there are movement areas greater than a predetermined threshold value T2, it is considered as that both the camera and user have moved.

Next, the movement area detector 210 obtains the camera movement parameters using Equation 3 as follows, and when the current frame includes the camera movement information, the movement area detector 210 removes the camera movement information. Equation 3 for extracting up/down or right left movement parameters is as follows.

$$h_t(x) = \sum_{y=0}^{h}\sum_{k=-p}^{p}\sum_{l=o}^{dh}\sum_{j=p}^{w-p}(E_t(y+l,j)-E_{t-1}(y+l,j+k))$$

$$\text{pan} = \text{argmin } h_t(x)$$

$$v_t(y) = \sum_{x=o}^{w}\sum_{k=-t}^{t}\sum_{l=o}^{dv}\sum_{i=t}^{h-t}(E_t(i,x+l),E_{t-1}(i+k,x+l))$$

$$\text{tilt} = \text{argmin } v_t(y)$$

(Equation 3)

Figure 6:
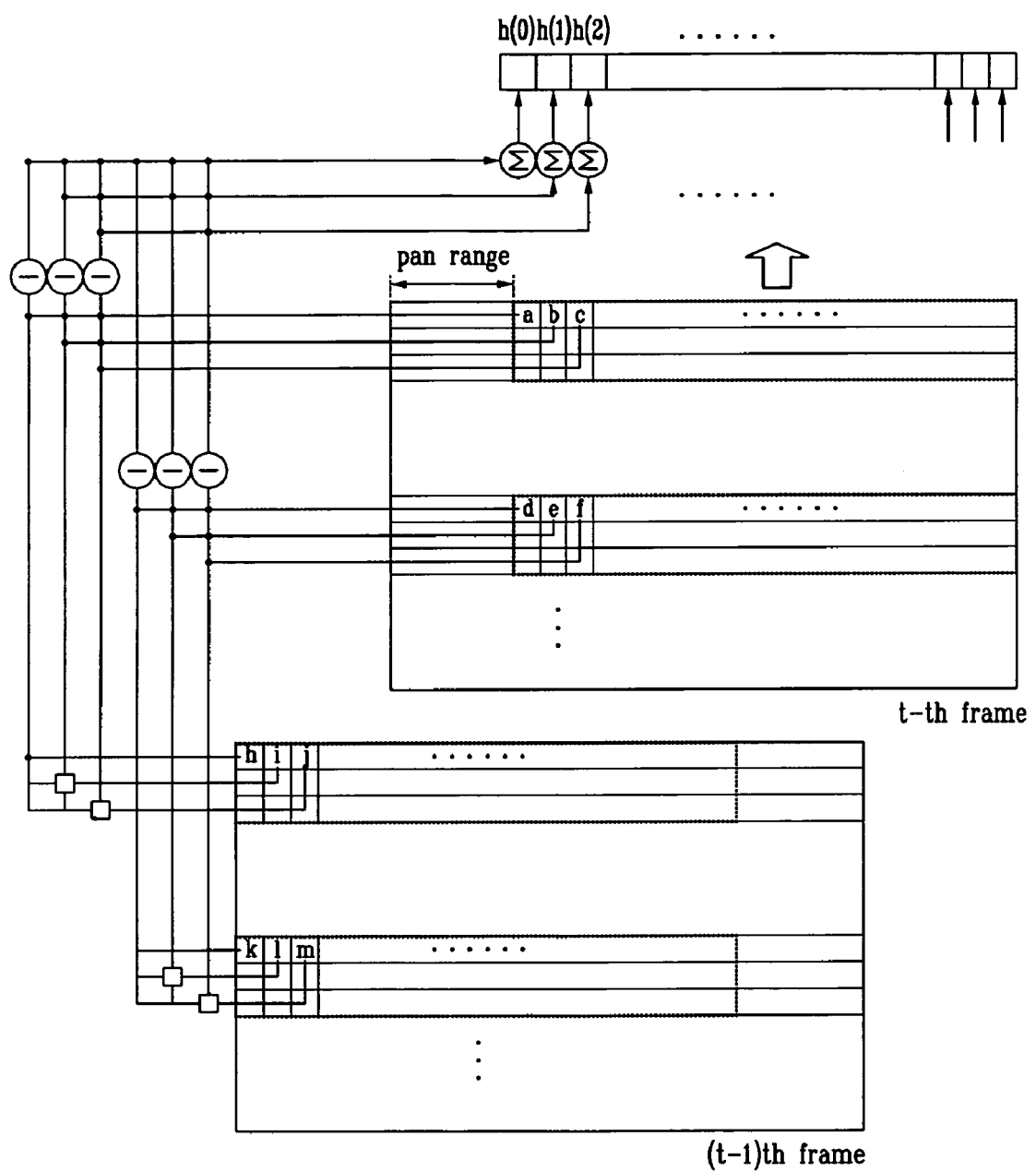
FIG. 6 and FIG. 7 respectively illustrate a method for extracting a correction parameter to correct a right/left movement of the camera according to an exemplary embodiment of the present invention.

In Equation 3, $h_t(x)$ is defined to obtain an x-direction movement value of the camera, as shown in FIG. 6, and is given as a difference between edge values E(y,x) of the t-th frame and the (t−1)-th frame.

In this case, the y value implies an image height ranging from 0 to h, and k moved from −p to p implies a pan in which the camera moves transversely (x direction). In addition, since k is set in the range of −p to p, the x value, that is, j, is set in the range of p to w−p.

That is, FIG. 6 illustrates a process for obtaining x-direction movement values h(0), h(1), and h(2) by a pixel scale, wherein values h(0), h(1), and h(2) are respectively given as x-direction movement values obtained at the t-th image frame. When the camera movement value h(0) is calculated at a predetermined x component i of the image frame, h(1) may be calculated at a predetermined x component i+1 and h(2) may be calculated at a predetermined x component i+2.

In FIG. 6, a, b, c, d, e, and f respectively indicate a pixel showing an edge component at the t-th frame and h, i, j, k, l, and m respectively indicate a pixel showing an edge component at the (t−1)-th frame. In order to obtain the value h(0), the pixels belonging to a predetermined row i of the t-th image frame must be compared with the pixels belonging to a predetermined row j of the (t−1)-th image. In this embodiment, a and d of the t-th image frame are compared with h and k of the (t−1)-th image frame. Likewise, in order to obtain the value h(1), b and e of the t-th image frame must be compared with i and l of the (t−1)-th image frame, and in order to obtain the value h(2), c and f of the t-th image frame must be compared with j and m of the (t−1)-th image frame.

After such a process is performed for the entire image width, the edge compared values of the pixels belonging to a predetermined row of the t-th image frame are added, thereby obtaining the values h(0), h(1), and h(2).

Figure 7:
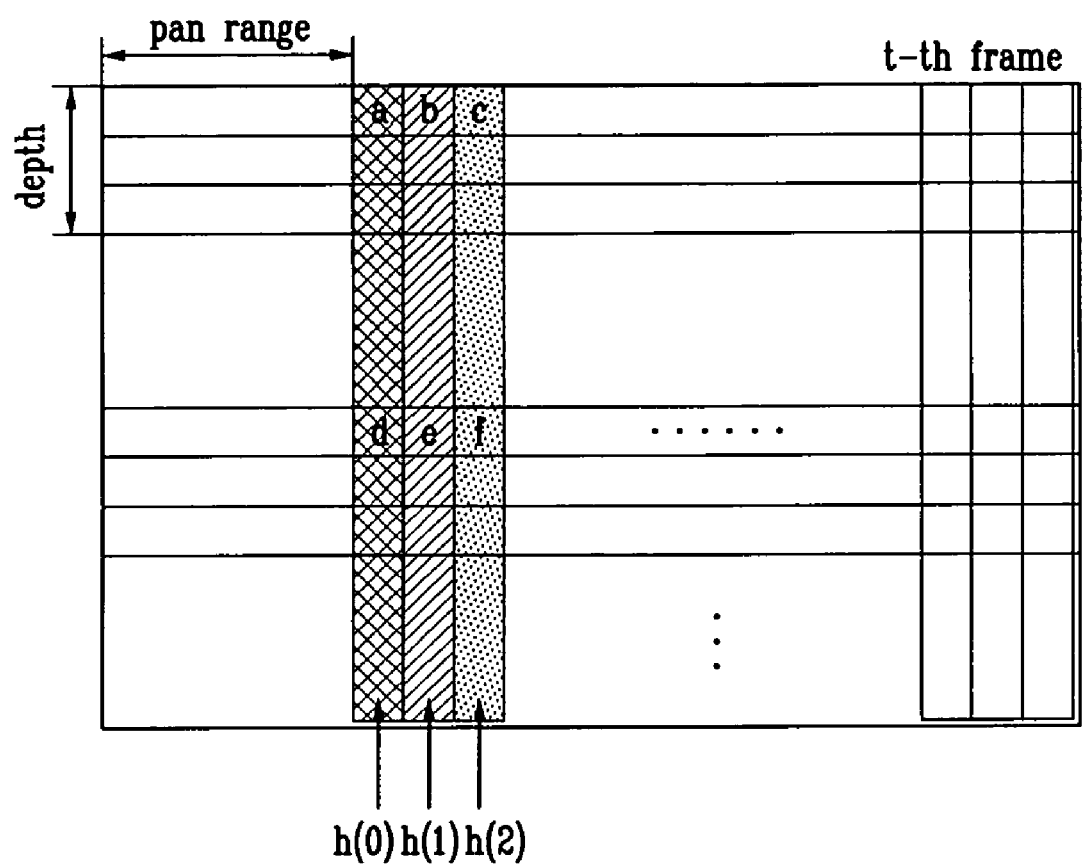

Therefore, as shown in FIG. 7, when the edge values of the (t−1)-th image frame and the t-th image frame are compared, the camera movement values h(0), h(1), and h(2) may be obtained at the t-th frame. Accordingly, the parameters for correcting for camera movement do not need to be detected over the entire image area in the range of l=0 to dh(depth), but need be detected over only a part of the image, that is, detected over the (t−1)-th image frame and the t-th image frame.

That is, in order to extract left/right movement correcting parameters, a camera movement parameter-extracting algorithm is used for only a part of the frame image. Accordingly, the extracting time for the camera movement parameters becomes reduced in comparison with that when using the entire frame image. In addition, the x-directional movement of the camera can be obtained using pan values of the above equation.

Meanwhile, $v_t(y)$ is defined as a parameter for obtaining a y-direction movement value and can be obtained using the similar method as the method for obtaining the x-direction movement value.

That is, the edge values of the t-th and (t−1)-th frame are detected over l=0 to dv, that is, over a part of the image within a range of a probability that the camera will move up/down over the entire image width in the range of x=0 to w.

The movement area extractor 210 converts the t-th image using the camera movement parameters pan and tilt obtained by Equation 3. In this case, x' and y' values of the t-th frame may be obtained from x'=x+pan and y'=y+tilt using the values x and y of the (t−1)-th image frame. In addition, image movement, from which the camera movement information has been firstly removed, that is, movement candidate areas, may be extracted by generating an image difference between the converted t-th frame image and the (t−1)-th frame image.

That is, when the camera moves only in the x/y-direction, the camera movement information can be entirely removed by the right/left movement parameters (pan) and up/down movement parameters (tilt) extracted in the above-described manner. However, since a dynamic camera mounted on the robot also moves forward, camera movement information cannot be wholly removed. Therefore, a person shape is finally extracted considering the image feature information extracted by the image feature information extractor 220 and the movement candidate areas.

Now, the image feature information extractor 220 is described in detail.

When the previously obtained motion pixel excludes the camera movement information, or the image movement areas (hereinafter, called movement candidate areas), from which the camera movement information has already been removed, are detected, the image feature information extractor 220 detects the target, for example, feature information of a person shape, regardless of the camera movement.

Figure 8:
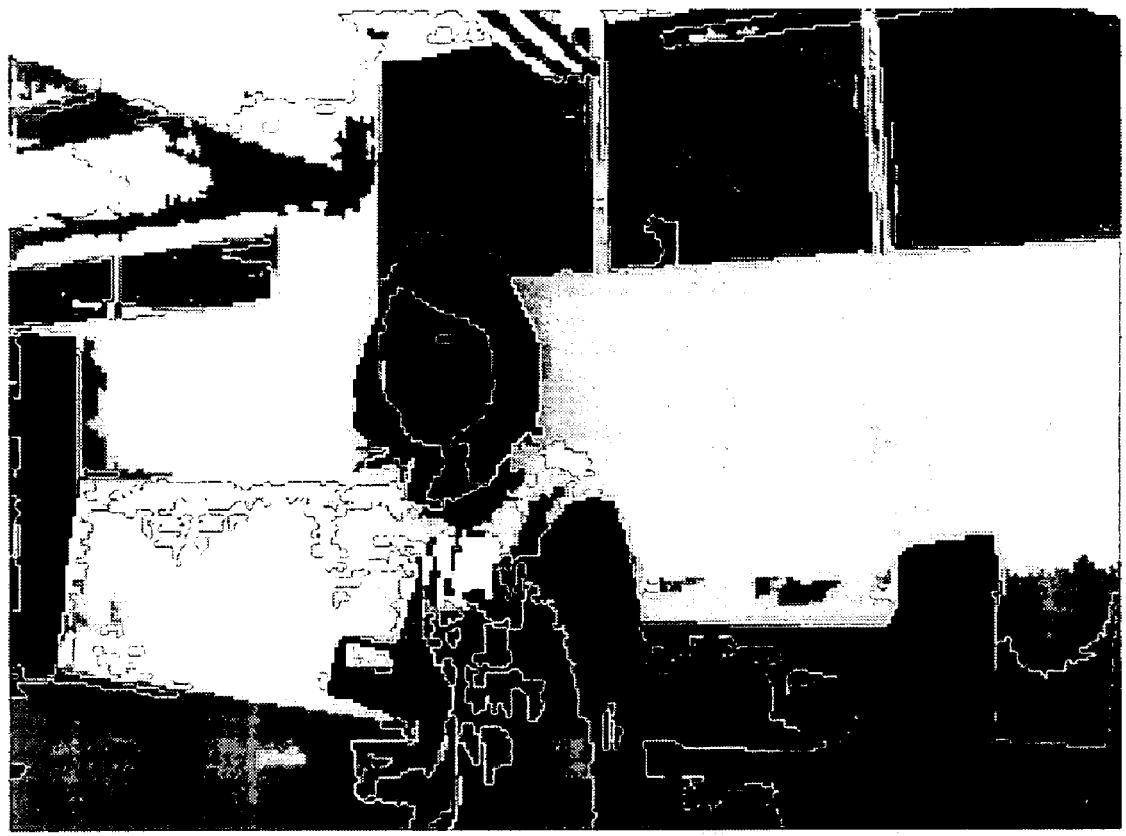
FIG. 8 illustrates a color-clustered image for showing image features, which are used to extract a shape according to an exemplary embodiment of the present invention.
Figure 9:
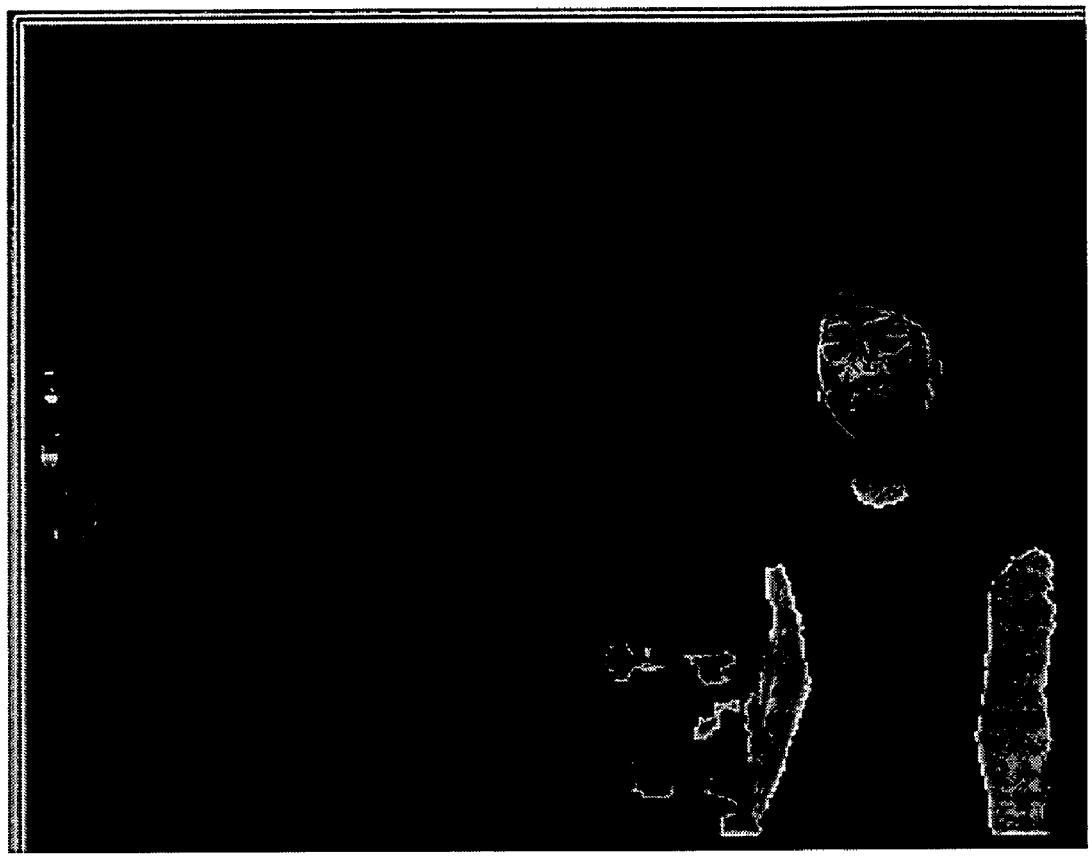
FIG. 9 illustrates a skin color area image for showing image features extracting skin color areas, which are used to extract a human shape according to an exemplary embodiment of the present invention.

The image feature information extractor 220 extracts a face area and a hand area using the shape information obtained through a color-clustering method as shown in FIG. 8 and the skin color information as shown in FIG. 9. In this case, the extracted face area and hand area can be used as feature information for verifying a face and a gesture.

The image feature information used to extract the person shape is as follows.

$$E_t^v = -f_t(x-1,y-1) + f_1(x+1,y-1) - 2\times f_t(x-1,y) +$$
$$2\times f_t(x+1,y) - f_t(x-1,y+1) + f_t(x+1,y+1)$$
$$E_t^h = -f_t(x-1,y-1) - 2\times f_t(x,y-1) - f_t(x+1,y-1) +$$
$$f_t(x-1,y+1) + 2\times f_t(x,y+1) + f_t(x+1,y+1)$$
$$E_t = \sqrt{(E_t^v)^2 + (E_t^h)^2}$$

(Equation 4)

In Equation 4, $E_t$ is given as the t-th edge image frame, and the edge values of the pixel (x, y) may be obtained using edge extraction formula of vertical/horizontal direction as shown in Equation 4.

In addition, the skin color area is extracted as follows.

If $[C_t^b(x, y) > \alpha \times C_t^r(x, y) \& C_t^b(x, y) > \beta \times C_t^r(x, y) \& C_t^g(x,$  (Equation 5)

$y) > \gamma \times C_t^r(x, y) \& C_t^g(x, y) > \delta \times C_t^r(x, y)] \&$ $[\varepsilon < H[x + w \times y] < \eta] \& [\omega < S[x + w \times y] < \zeta]$ Then $f_t(x + w \times y)$ is skincolor In Equation 5, $C_t^r$, $C_t^g$, and $C_t^b$ are respectively given as r, g, and b values of the t-th frame image, and H and S are given as H(ue) and S(aturation) values respectively calculated from the $C_t^r$, $C_t^g$, and $C_t^b$. $\alpha$, $\beta$, $\gamma$, $\delta$, $\epsilon$, $\eta$, $\omega$, $\zeta$ are respectively constants obtained through experiment.

Next, the human shape extractor 230 detects a shape of a moving person by combining the movement candidate area detected by the movement area extractor 210 with shape feature information detected by the image feature information extractor 220, that is, a silhouette.

That is, the movement candidate areas detected by the movement area extractor 210 are expressed in a box shape such as (xleft, ytop) and (xright, ybottom). The shape extractor 230 considers an area having skin color as to be a shape area among the movement candidate areas, and extracts a silhouette of a person using the shape feature information obtained by the color clustering method and the edge information.

For example, the human shape extractor 230 detects an area having skin color among the movement candidate areas, and tracks the areas viewed as a head, arms, and a body in the vicinity of the corresponding area using shape and edge information.

Figure 10:
FIG. 10 shows an image in which the camera movement has been compensated.

Therefore, as shown in FIG. 10, even when both the camera and the person move, an image, from which the camera movement is removed, can be obtained.

The tracker 300, which includes a blob information extractor 310 and a human shape tracker 320, extracts the blob information for the extracted shape of the person and tracks targets by matching the blobs to be tracked.

In more detail, the blob information extractor 310 obtains blob information, such as a blob position, size, shape, and color distribution or the like, for the extracted person shape blob area to obtain target characteristics.

The human shape tracker 320 matches the blob information of the person shape to be tracked at the t-th frame with blob information of the moving person shape extracted at the (t−1)-th frame. In addition, blobs corresponding to noise are removed by analyzing the matched image blobs. Generally noise is determined based on the size of the blobs. Next, at the respective frames, color distribution is extracted for the extracted blobs and the target to be tracked is checked.

In more detail, the human shape tracker 320 extracts the blobs of the person shape to be tracked from the moving object of the consecutive frames, and analyzes the blobs and tracks the person shape. Therefore, it is possible to track a moving object at a high-speed and in real-time and to track the target even when a part or a whole of the target is moving.

Figure 11:
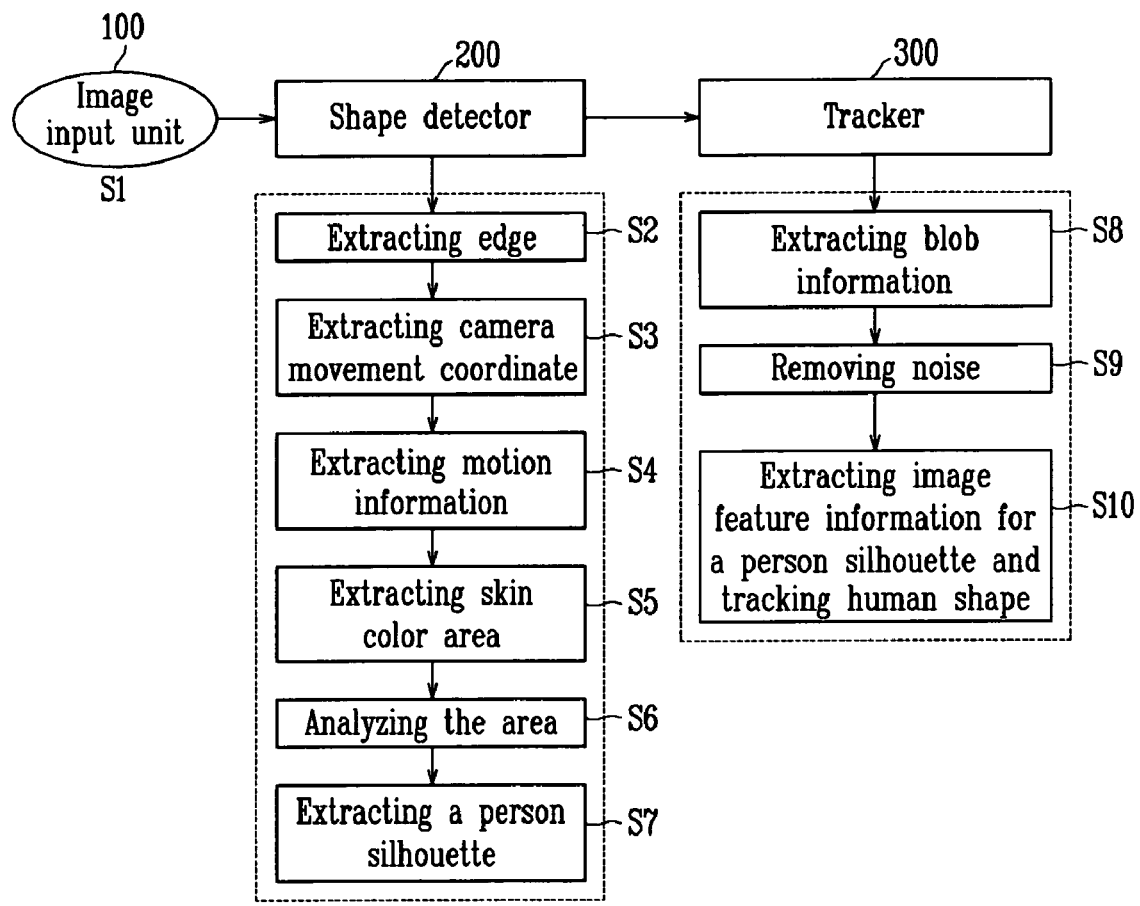
FIG. 11 is a schematic diagram of a target detecting system according to an exemplary embodiment of the present invention.

Now, a target detecting method according to an exemplary embodiment of the present invention will be described in brief with reference to FIG. 11.

First, when the image input unit 100, such as a dynamic camera mounted to a mobile robot, obtains a target image (S1), the shape detector 200 determines whether there is a motion pixel using an image difference between adjacent frames among a consecutive image sequence transmitted from the image input unit 100, and on there being the motion pixel, the shape detector 200 extracts the movement information.

On there being camera movement information, such as camera viewpoint, camera position, camera sway, or the like, the shape detector 200 analyzes the movement information, extracts the edge information between the frames (S2), and obtains the camera up/down or right/left movement parameters capable of correcting the camera movement information by comparing edges between the t-th image frame and the (t−1)-th image frame in an m×n image area (S3).

In addition, the shape detector 200 converts the t-th image frame using the camera movement parameters, and then extracts the movement candidate area, by obtaining the difference between the t-th image frame and the (t−1)-th image frame (S4).

Next, the shape detector 200 extracts the skin color area so as to extract the image feature information (S5). In addition, areas displaying skin color among the movement candidate areas are considered as person shape areas and are analyzed using the edge information and the shape feature information obtained by the color-clustering method (S6).

In more detail, the areas are analyzed using the edge information and the shape feature information obtained by the color-clustering method in the vicinity of the area having skin color among the corresponding movement candidate areas (S6), and the areas considered as a head, arms, a body, or the like, are detected to extract a silhouette (S7).

Next, the tracker 300 extracts the blob information so that the extracted shape blobs of the extracted t-th frame are matched with the extracted shape blobs of the extracted (t−1)-th frame (S8). In addition, blobs corresponding to noise are removed by analyzing the matched image blobs. Generally noise is determined based on the size of the blobs (S9). Finally, the tracker 300 tracks the target by checking whether the target is correct by extracting color distribution for the extracted blobs at the respective frames (S10).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As above described, according to an exemplary embodiment of the present invention, when the moving object to be tracked is extracted at the present frame and the next frame for consecutive image frames and the respective blob information of the extracted moving bodies is obtained, the target blob, that is, the moving object, can be tracked.

Conventionally, when the moving object is separated from the background and the predictable moving direction components are estimated for the extracted moving object, how much distance the target moves has been tracked by various methods. Particularly, the predictable moving direction has been estimated using a filter capable of predicting a moving direction and the real moving position has been calculated for the movable direction of respective pixels or local areas. Accordingly, according to the conventional method, it takes a relatively long time to extract and track a moving object so that it is impossible to track and extract the same in real-time. In addition, when the whole or part of the target appears and disappears, it is impossible to track the target.

However, according to an exemplary embodiment of the present invention, the target can be tracked at a high-speed and in a real-time by analyzing a blob after extracting the moving object of consecutive frames, that is, the blob. Also, even when a part or the whole of the target appears and disappears, it is easy to track the moving target.

Therefore, since a moving person can be tracked in real-time regardless of the background or camera movement, methods for tracking a moving object can be applied to a real environment.

What is claimed is:

1. A target detecting method for detecting a target from an input image from a camera, comprising the steps of:
   a shape detector configured for obtaining camera movement parameters from a movement area in an input image from the camera, and correcting an image frame using the obtained movement parameters,
   extracting movement candidate areas from the input image frame and a previously input image frame,
   extracting image feature information from the input image, and
   extracting a target shape based on the movement candidate areas and the image feature information;
   a tracker is configured for generating blob information from the extracted shape, and
   wherein the blob information is an image or an image portion formed by binding adjacent pixels having the same characteristics in the image;
   extracting blob information for the extracted shape; and
   checking whether the target is correct by comparing the blob information with that of the shape extracted at the previous frame regardless of background or the camera movement,
   wherein the extracting image feature information from the input image further comprises skin color areas are extracted from the input image, skin color being extracted as follows:

If $[C_t^b(x, y) > \alpha \times C_t^r(x, y)$ & $C_t^b(x, y) > \beta \times C_t^r(x, y)$ & $C_t^g(x, y) > \gamma \times C_t^r(x, y)$ & $C_t^g(x, y) > \delta \times C_t^r(x, y)]$ & $[\varepsilon < H[x + w \times y] < \eta]$ & $[\omega < S[x + w \times y] < \zeta]$ Then $f_t(x + w \times y)$ is skincolor wherein $C_t^r$, $C_t^g$, and $C_t^b$ are respectively r, g, and b values of the t-th frame images, H and S are respectively H(ue) and S(aturation) values obtained from $C_t^r$, $C_t^g$, and $C_t^b$, $\alpha, \beta, \gamma, \delta, \varepsilon, \eta, \omega, \zeta$ are constants obtained by experiments, and w is a width of the image.

2. The target detecting method of claim 1, wherein the obtaining camera movement parameters from the movement area in the input image from the camera, and correcting the image frame using the obtained movement parameters further comprises the input image frame is compensated using the camera movement parameters when the movement area is greater than a predetermined threshold value ($T_2$).

3. The target detecting method of claim 1, further comprising prior to the obtaining camera movement parameters from the movement area in the input image from the camera, and correcting the image frame using the obtained movement parameters further comprises the additional step of determining if there is a motion pixel, which is a pixel with a brightness difference of pixels (x,y) between consecutive image frames greater than a predetermined threshold value ($T_1$), and then, at the obtaining camera movement parameters from the movement area in the input image from the camera, and correcting the image frame using the obtained movement parameters further comprises the image frame is transformed on there being a motion pixel.

4. The target detecting method of claim 3, wherein the motion pixel is extracted as follows, If $|f_t(x, y) - f_{t-1}(x, y)| > T_1$ & $|f_{t+1}(x, y) - f_t(x, y)| >$ $T_1$ then $m_{t+1}(x, y)$ is moving object pixel wherein $f_{t-1}$, $f_t$, and $f_{t+1}$ are (t−1)-th, t-th, and (t+1)-th frames respectively, $T_1$ is a threshold value for a brightness difference between frames, f(x,y) is a brightness value of a pixel (x,y) at a frame, and $m_{t+1}$ (x,y) is a motion pixel (x,y) of (t+1)-th frame.

5. The target detecting method of claim 4, wherein the threshold value ($T_1$) satisfies $10 \leq T_1 \leq 20$.

6. The target detecting method of claim 3, wherein the motion pixel is extracted from the entire pixels of the input image.

7. The target detecting method of claim 3, wherein the obtaining camera movement parameters from the movement area in the input image from the camera, and correcting the image frame using the obtained movement parameters further comprises whether the movement area is greater than a predetermined threshold value ($T_2$) is determined by checking whether a difference between a maximum value x and a minimum value x among connected components of the motion pixels is greater than a predetermined threshold value ($T_2$) in comparison with the entire image width.

8. The target detecting method of claim 1, wherein the camera movement parameter is defined to correct the camera right/left movement and includes x/y-direction movement parameters.

9. The target detecting method of claim 8, wherein the x-direction movement parameter is extracted for a part of the image from the edge compared values between the pixels of a predetermined row i of the t-th image frame and the pixels of a predetermined row j of the (t−1)-th image frame.

10. The target detecting method of claim 9, wherein the x-direction movement parameter (pan) is extracted as follows:

$$h_t(x) = \sum_{y=0}^{h} \sum_{k=-p}^{p} \sum_{l=o}^{dh} \sum_{j=p}^{w-p} (E_t(y+l, j) - E_{t-1}(y+l, j+k))$$

$$\text{pan} = \operatorname{argmin} h_t(x)$$

wherein y is a height of the image in the range of 0 to h, k is a possible range which the camera will move right/left, j is a range of x values, l is a y area range for which edge values are detected, $E_t(y+l, j)$ and $E_{t-1}(y+l, j+k)$ are an edge value of the pixels (y+l, j) and (y+l, j+k) on t-th and (t−1)-th edge image frames, respectively, and $h_t(x)$ is a defined value to obtain an x-direction movement parameter.

11. The target detecting method of claim 8, wherein the y-direction movement parameter is extracted for a part of the image from the edge compared values between pixels of a predetermined row i of the t-th image frame and pixels of a predetermined row j of the (t−1)-th image frame.

12. The target detecting method of claim 11, wherein the y-direction movement parameter (tilt) is extracted as follows:

$$v_t(y) = \sum_{x=o}^{w} \sum_{k=-t}^{t} \sum_{l=o}^{dv} \sum_{i=t}^{h-t} (E_t(i, x+l), E_{t-1}(i+k, x+l))$$

$$\text{tilt} = \arg\min v_t(y)$$

wherein x is a width of the image in the range of 0 to w, k is a possible range which the camera will move up/down, j is a range of y values, l is an x area range for which edge values are detected, $E_t(i, x+l)$ and $E_{t-1}(i+k, x+l)$ are an edge value of the pixels (i, x+l) and (i+k, x+l) on t-th and (t−1)-th edge image frames, respectively, and $v_t(y)$ a defined value to obtain a y-direction movement parameter.

13. The target detecting method of claim 1, wherein the obtaining camera movement parameters from the movement area in the input image from the camera, and correcting the image frame using the obtained movement parameters further comprises correcting an image frame using the obtained camera movement parameters, x' and y' values of the t-th frame are transformed to be x'=x+pan and y'=y+tilt by using x-direction movement parameter (pan), y-direction movement parameter (tilt), and x and y of the (t−1)-th frame.

14. The target detecting method of claim 1, wherein the extracting movement candidate areas from the input image frame and the previously input image frame further comprises the movement candidate areas are extracted by generating an image difference between the t-th frame image and the (t−1)-th frame image.

15. The target detecting method of claim 1, wherein the image feature information includes at least one among skin color, shape, and corner information.

16. The target detecting method of claim 1, wherein the extracting image feature information from the input image further comprises the shape feature information is extracted by a color clustering method of the input image.

17. A target detecting method for detecting a target from an input image from a camera, comprising the steps of:
  a shape detector configured for obtaining camera movement parameters from a movement area in an input image from the camera, and correcting an image frame using the obtained movement parameters,
  extracting movement candidate areas from the input image frame and a previously input image frame,
  extracting image feature information from the input image, and
  extracting a target shape based on the movement candidate areas and the image feature information;
  a tracker is configured for generating blob information from the extracted shape, and
  wherein the blob information is an image or an image portion formed by binding adjacent pixels having the same characteristics in the image;
  extracting blob information for the extracted shape; and
checking whether the target is correct by comparing the blob information with that of the shape extracted at the previous frame regardless of background or the camera movement,
  wherein the extracting image feature information from the input image further comprises the edge information is extracted from the input image, the edge information, that is, the edge value $(E_t)$ of the pixel (x,y) being extracted as follows:

$$E_t^v = -f_t(x-1, y-1) + f_t(x+1, y-1) - 2 \times f_t(x-1, y) +$$
$$2 \times f_t(x+1, y) - f_t(x-1, y+1) + f_t(x+1, y+1)$$
$$E_t^h = -f_t(x-1, y-1) - 2 \times f_t(x, y-1) - f_t(x+1, y-1) +$$
$$f_t(x-1, y+1) + 2 \times f_t(x, y+1) + f_t(x+1, y+1)$$
$$E_t = \sqrt{(E_t^v)^2 + (E_t^h)^2}$$

wherein $E_t$ is the t-th edge image frame, $E_t^v$ is the vertical direction edge value of the pixel (x, y), $E_t^h$ is the horizontal direction edge value of the pixel (x, y), and $f_t(x,y)$ is the brightness value of the pixel (x,y).

18. The target detecting method of claim 1, wherein the extracting the target shape based on the movement candidate areas and the image feature information further comprises skin color areas are extracted from the movement candidate areas and then the target image is extracted using the shape feature information and the edge feature information.

19. The target detecting method of claim 1, wherein the blob information includes at least one among blob position, blob size, blob shape, and color distribution.

20. The target detecting method of claim 1, wherein the checking whether the target is correct by comparing the blob information with that of the shape extracted at the previous frame further comprises:
  removing blobs corresponding to noise by matching the blob information for the extracted target shape information with the blob information of the shape extracted at the previous frame; and
  checking whether the target is correct by extracting a color distribution of the extracted blobs.

21. The target detecting method of claim 20, wherein the removing blobs corresponding to noise by matching the blob information for the extracted target shape information with the blob information of the shape extracted at the previous frame further comprises determining whether the blobs correspond to noise based on the size of the blob.

22. A target detecting system for detecting a target from an input image, comprising:
  a camera that obtains a target image to be detected and which transmits the obtained target image to a shape detector;
  a shape detector, operatively coupled to said camera, said shape detector extracting a shape from the obtained target image based on movement candidate areas and image feature information extracted through an image difference of temporally-consecutive frames among an image sequence transmitted from the image input unit,
  a tracker that extracts blob information for the extracted shape and verifies whether the target is correct by comparing the blob information with the shape extracted at the previous frame regardless of background or the camera movement, and
  wherein the blob information is an image or an image portion formed by binding adjacent pixels having the same characteristics in the image,
  wherein the shape detector further comprises:
  a movement area extractor for extracting the movement candidate area from an image frame and a previous input image frame;
  an image feature information extractor for extracting image feature information from the input image; and a shape extractor for extracting the shape of the target image based on the movement candidate area and the image feature information, and wherein the image feature information extractor extracts at least one among skin color, shape, and corner information from the input image, wherein:

the skin color is extracted as follows $$\text{If } [C_t^b(x, y) > \alpha \times C_t^r(x, y) \ \& \ C_t^b(x, y) > \beta \times C_t^r(x, y) \ \& \ C_t^g(x, y) >$$

$$\gamma \times C_t^r(x, y) \ \& \ C_t^g(x, y) > \delta \times C_t^r(x, y)] \ \& \ [\varepsilon < H[x +$$

$$w \times y] < \eta] \ \& \ [\omega < S[x + w \times y] < \zeta]$$

$$\text{Then } f_t(x + w \times y) \text{ is } skincolor$$

wherein $C_t^r$, $C_t^g$, $C_t^b$ are respectively r, g, and b values of the t-th frame images, H and S are H(ue) and S(aturation) values obtained from $C_t^r$, $C_t^g$, and $C_t^b$, $\alpha$, $\beta$, $\gamma$, $\delta$, $\epsilon$, $\eta$, $\omega$, $\zeta$ are constants obtained by experiment, and w is a width of the image;

the edge value ($E_t$) of the pixel (x,y) is obtained as follows, $$E_t^v = -f_t(x-1, y-1) + f_t(x+1, y-1) - 2 \times f_t(x-1, y) +$$

$$2 \times f_t(x+1, y) - f_t(x-1, y+1) + f_t(x+1, y+1)$$

$$E_t^h = -f_t(x-1, y-1) - 2 \times f_t(x, y-1) - f_t(x+1, y-1) +$$

$$f_t(x-1, y+1) + 2 \times f_t(x, y+1) + f_t(x+1, y+1)$$

$$E_t = \sqrt{(E_t^v)^2 + (E_t^h)^2}$$

wherein is the $E_t$ is the t-th edge image frame, $E_t^v$ is the vertical direction edge value of the pixel (x, y), $E_t^h$ is the horizontal direction edge value of the pixel (x, y), and $f_t(x,y)$ is the brightness value of the pixel (x,y);

and the shape feature information is extracted through color clustering of the input image.

23. The system for detecting a target of claim 22, wherein the movement area extractor extracts the movement candidate area by obtaining camera movement parameters when the movement area of the input image is greater than a predetermined threshold value ($T_2$) and using the obtained camera movement parameters to correct the image frame.

24. The system for detecting a target of claim 22, wherein the movement area extractor checks whether the movement area of the input image is greater than a predetermined threshold value ($T_2$) on there being a motion pixel, which is a pixel with a brightness difference between consecutive image frames greater than a predetermined threshold value ($T_1$).

25. The system for detecting a target of claim 24, wherein the motion pixel is extracted as follows:

$$\text{If } |f_t(x, y) - f_{t-1}(x, y)| > T_1 \ \& \ |f_{t+1}(x, y) - f_t(x, y)| >$$

$$T_1 \text{ then } m_{t+1}(x, y) \text{ is moving object pixel}$$

wherein $f_{t-1}$, $f_t$, and $f_{t+1}$ are respectively (t−1)-th, t-th, (t+1)-th frames, $T_1$ is a threshold value for brightness difference between frames, f(x,y) is a brightness value of a pixel (x,y) at a frame, and $m_{t+1}(x,y)$ is a motion pixel (x,y) of the (t+1)-th frame.

26. The system for detecting a target of claim 25, wherein the threshold value ($T_1$) satisfies $10 \leq T_1 \leq 20$.

27. The system for detecting a target of claim 24, wherein the motion pixel is extracted from the entire pixels of the input image.

28. The system for detecting a target of claim 24, wherein the movement area extractor checks, on there being motion pixels, whether a difference between a maximum value x and a minimum value x among connected components of the motion pixels is greater than a predetermined threshold value ($T_2$) in comparison with the entire image width when the movement area is greater than a predetermined threshold value ($T_2$).

29. The target detecting system of claim 23, wherein the camera movement parameters are defined to correct the right/left movement of the camera and include an x-direction movement parameter and a y-direction movement parameter, the x-direction movement parameter being extracted from the edge compared values between pixels of a predetermined row i of the t-th image frame and pixels of a predetermined row j of the (t−1)-th image frame for a part of the image, and the y-direction movement parameter being extracted from the edge compared values between pixels of a predetermined row i of the t-th image frame and pixels of a predetermined row j of the (t−1)-th image frame for a part of the image.

30. The target detecting system of claim 29, wherein the x-direction movement parameter (pan) is extracted as follows:

$$h_t(x) = \sum_{y=0}^{h} \sum_{k=-}^{p} \sum_{pl=o}^{dh} \sum_{j=p}^{w-p} (E_t(y+l, j) - E_{t-1}(y+l, j+k))$$

$$\text{pan} = \operatorname{argmin} h_t(x)$$

wherein y is a height of the image in the range of 0 to h, k is a possible range which the camera will move right/left, j is a range of x values, l is a y area range checking edge values, $E_t(y+l, j)$ and $E_{t-1}(y+l, j+k)$ are an edge values of the pixels (y+l, j) and (y+l, j+k) on t-th and (t−1)-th edge image frames, respectively, and $h_t(x)$ is a defined value to obtain an x-direction movement parameter.

31. The target detecting system of claim 29, wherein the y-direction movement parameter (tilt) is extracted as follows:

$$v_t(y) = \sum_{x=o}^{w} \sum_{k=-}^{t} \sum_{u=o}^{dv} \sum_{i=t}^{h-t} (E_t(i, x+l), E_{t-1}(i+k, x+l))$$

$$\text{tilt} = \operatorname{argmin} v_t(y)$$

wherein x is a width of the image in the range of 0 to w, k is a possible range which the camera will move up/down, j is a range of y values, l is an x area range checking edge values, $E_t(i, x+l)$ and $E_{t-1}(i+k, x+l)$ are an edge values of the pixels (i, x+l) and (i+k, x+l) on t-th and (t−1)-th edge image frames, respectively, and $v_t(y)$ a defined value to obtain a y-direction movement parameter.

32. The target detecting system of claim 31, wherein the movement area extractor corrects the t-th frame image by x' and y' values of the t-th frame obtained as x'=x+pan and y'=y+tilt using the x-direction movement parameter (pan), the y-direction movement parameter (tilt), and x and y of the (t−1)-th frame, and extracts the movement candidate areas by generating an image difference between the t-th frame image and (t−1)-th frame image.

33. The target detecting system of claim 22, wherein the image characteristic information includes at least one among skin color, shape, and corner information.

34. The target detecting system of claim 22, wherein the shape extractor extracts the skin color areas from the movement candidate areas and then extracts the target area using the edge feature.

35. The target detecting system of claim 22, wherein the tracker includes a blob information extractor for extracting the blob information for the extracted shape of the target; and a human shape tracker for removing blobs corresponding to noise by matching the blob information for the extracted target shape information with the blob information of the shape extracted at the previous frame and checking whether the target is correct by extracting a color distribution of the extracted blobs.

36. The target detecting system of claim 22, wherein the blob information includes at least one among blob position, blob size, blob shape, and color distribution.

* * * * *